(12) United States Patent
Masuda (10) Patent No.: US 10,377,355 B2
(45) Date of Patent: Aug. 13, 2019

(54) ELECTRIC BRAKE DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 19 days.

(21) Appl. No.: 15/888,574

(22) Filed: Feb. 5, 2018

(65) Prior Publication Data
US 2018/0154872 A1 Jun. 7, 2018

Related U.S. Application Data

(63) Continuation of application No. PCT/JP2016/073932, filed on Aug. 16, 2016.

(30) Foreign Application Priority Data

Aug. 21, 2015 (JP) ................... 2015-163868

(51) Int. Cl.
*B60T 8/17* (2006.01)
*B60T 13/74* (2006.01)
(Continued)

(52) U.S. Cl.
CPC ............. *B60T 8/172* (2013.01); *B60T 13/74* (2013.01); *B60T 13/741* (2013.01); *F16D 65/18* (2013.01);
(Continued)

(58) Field of Classification Search
CPC .......... B60T 8/171; B60T 8/172; B60T 13/74; B60T 13/741; F16D 2121/24
(Continued)

(56) References Cited

U.S. PATENT DOCUMENTS 9,694,799 B2 * 7/2017 Baehrle-Miller ..... B60T 13/588
2002/0026272 A1 2/2002 Yamamoto
(Continued)

FOREIGN PATENT DOCUMENTS

DE 198 41 170 C1 2/2000
JP 2003-247576 9/2003
(Continued)

OTHER PUBLICATIONS

Extended European Search Report dated Feb. 19, 2018 in corresponding European Patent Application No. 16839150.6, 5 pages.
(Continued)

*Primary Examiner* — Thomas J Williams (57) ABSTRACT

An electric brake device includes an electric brake actuator and a control device. The controller includes: a brake control calculator that control a braking force so as to follow up a target braking force provided from a host ECU; a brake maintaining current estimator that maintains a motor current at a constant value; and a switching controller that performs switching between the brake control calculator and the brake maintaining current estimator. When a condition that an absolute value of a rate of change of the target braking force is equal to or less than a predetermined value and the braking force is in the follow-up state is satisfied, the switching controller performs switching from the brake control calculator to the brake maintaining current estimator that maintains the motor current at a constant value.

6 Claims, 8 Drawing Sheets

(51) Int. Cl.
  *F16D 65/18* (2006.01)
  *B60T 8/172* (2006.01)
  *F16D 66/00* (2006.01)
  *F16D 121/24* (2012.01)
  *F16D 125/34* (2012.01)

(52) U.S. Cl.
  CPC .......... *F16D 66/00* (2013.01); *F16D 2121/24* (2013.01); *F16D 2125/34* (2013.01)

(58) Field of Classification Search
  USPC .......................................................... 303/20
  See application file for complete search history.

(56) References Cited

U.S. PATENT DOCUMENTS

| 2005/0046270 | A1* | 3/2005 | Arakawa | B60T 13/741 |
| | | | | 303/3 |
| 2012/0151914 | A1 | 6/2012 | Nishioka et al. | |
| 2013/0197771 | A1 | 8/2013 | Takeda et al. | |
| 2015/0097416 | A1 | 4/2015 | Ueura et al. | |
| 2016/0032995 | A1* | 2/2016 | Nishino | F16D 55/225 |
| | | | | 188/72.3 |

FOREIGN PATENT DOCUMENTS

| JP | 2008-184023 | | 8/2008 | |
| JP | 2010-270788 | | 12/2010 | |
| JP | 2015-145158 | | 8/2015 | |
| KR | 101501533 | B1 * | 3/2015 | .............. B60T 7/042 |

OTHER PUBLICATIONS

Extended European Search Report dated Feb. 18, 2019 in corresponding European Patent Application No. 16839150.6, 5 pages.
English Translation by WIPO of the International Preliminary Report on Patentability for International Patent Application No. PCT/JP2016/073932 dated Mar. 8, 2018, 6 pgs.
International Search Report dated Nov. 22, 2016 in corresponding International Patent Application No. PCT/JP2016/073932.

* cited by examiner

ELECTRIC BRAKE DEVICE

CROSS REFERENCE TO THE RELATED APPLICATION

This application is a continuation application, under 35 U.S.C. § 111(a), of international application No. PCT/JP2016/073932, filed Aug. 16, 2016, which is based on and claims Convention priority to Japanese patent application No. 2015-163868, filed Aug. 21, 2015, the entire disclosure of which is herein incorporated by reference as a part of this application.

BACKGROUND OF THE INVENTION

Field of the Invention

The present invention relates to an electric brake device, and relates to a technology that allows reduction in operating noise and reduction in power consumption.

Description of Related Art

Regarding the electric brake device using an electric motor, the following technologies have been proposed.

1. An electric brake device that controls a braking force by using an electric motor (Patent Document 1).
2. A disc brake provided with a sensor for detecting a pressing force of a friction pad (Patent Document 2).
3. An electric actuator that uses reverse efficiency to reduce power consumption (Patent Document 3).

RELATED DOCUMENT

Patent Document

[Patent Document 1] JP Laid-open Patent Publication No. 2003-247576
[Patent Document 2] JP Laid-open Patent Publication No. 2010-270788
[Patent Document 3] DE Patent No. 19841170

In the electric brake devices as disclosed in Patent Documents 1 and 2, reductions in operating noise and power consumption are concerned in some cases. In particular, when a screw mechanism disclosed in Patent Document 1 or the like is used, hysteresis characteristics are often caused mainly due to a frictional force, in which reaction force in operation of the electric motor differs between when the braking force increases and when the braking force decreases. Such hysteresis characteristics cause the relationship between a motor current and the braking force to have a hysteresis portion in which the motor current and the braking force are not one-to-one relationship. In this case, when it is attempted to keep the braking force constant, the braking force does not vary even when the motor current varies, while the relationship is in the hysteresis portion. Therefore, mainly due to influence of an integral factor, oscillation of the electric motor is likely to occur.

In the above case, power consumption may be increased due to the oscillation of the electric motor. In particular, when a brake load is small, for example, rattling noise of gears used for a speed reducer or reduction gear may cause increase in operating noise. For example, in the electric actuator using the reverse efficiency as disclosed in Patent Document 3, if the braking force is frequently set in the maintained state using the reverse efficiency while a command value varies, response may become stepwise, which may cause reduction in followability and increase in operating noise.

SUMMARY OF THE INVENTION

An object of the present invention is to provide an electric brake device capable of reducing operating noise, and reducing power consumption.

Hereinafter, for convenience of easy understanding, a description will be given with reference to the reference numerals in embodiments.

An electric brake device DB according to the present invention includes: a brake rotor 8; a friction member 9 configured to be brought into contact with the brake rotor 8; a friction member operating actuator 6 configured to bring the friction member 9 into contact with the brake rotor 8; an electric motor 4 configured to drive the friction member operating actuator 6; and a control device 2 configured to control a braking force by means of the electric motor 4. The control device 2 includes: a braking force follow-up controller 18 configured to control the braking force so as to follow up a target braking force provided from a higher-level control unit 17; a braking force maintaining controller 19 configured to maintain a current of the electric motor 4 or motor current at a constant value; and a switching controller 20 configured to perform switching between control (or output) by the braking force follow-up controller 18 and control (or output) by the braking force maintaining controller 19. The switching controller 20 includes: a constant target value determining function unit 25 configured to determine whether or not a target value is constant, depending on whether or not an absolute value of a rate of change of the target braking force is equal to or less than a predetermined value; and a follow-up state determining function unit 26 configured to determine whether or not the braking force is in a follow-up state to the target braking force, depending on whether or not a deviation between the braking force and the target braking force is within a predetermined range. When a condition, which the constant target value determining function unit 25 has determined that the target value is constant and the follow-up state determining function unit 26 has determined that the braking force is in the follow-up state, is satisfied, switching is performed from the control (or output) by the braking force follow-up controller 18 to the control (or output) by the braking force maintaining controller 19 which maintains the motor current at a constant value. The motor current maintained at the constant value by the braking force maintaining controller 19 is a motor current that is determined on the basis of the braking force or the target braking force obtained when the switching controller 20 has determined that the condition is satisfied.

The rate of change of the target braking force is a change (amplitude) of the target braking force per unit time, for example. The aforementioned "predetermined value" and "predetermined range" are each based on the result of a test, simulation, or the like. In this specification, a "braking force" indicates general values equivalent to the braking force. For example, a pressing force for pressing the friction member 9 against the brake rotor 8 may be used as a braking force. A braking torque of a wheel equipped with the electric brake device DB may be detected by using, for example, a torque sensor, and the detected value may be used as a braking force. Alternatively, a relationship between a braking force and an electric motor angle may be studied in advance based on rigidity of an actuator, and the electric motor angle may be used as a parameter equivalent to a braking force.

According to this configuration, in the normal state, the braking force follow-up controller 18 controls the braking force so as to follow up the target braking force provided from the higher-level control unit 17. The switching controller 20 determines whether or not the constant target value determining function unit 25 has determined that the rate of change of the target braking force is equal to or less than the predetermined value (e.g., the target braking force is substantially constant) and the follow-up state determining function unit 26 has determined that the deviation between the braking force and the target braking force is within the predetermined range (e.g., the braking force is in the follow-up state). Upon determining that the above condition is satisfied, the switching controller 20 performs switching from the control by the braking force follow-up controller 18 to the control by the braking force maintaining controller 19 that maintains the motor current at the constant value. The motor current in the braking force maintaining controller 19 is determined based on the braking force or the target braking force obtained when the switching controller 20 has determined that the condition is satisfied.

Since the electric brake device, in which oscillation of the electric motor is likely to occur due to the influence of hysteresis characteristics, is provided with the braking force maintaining controller 19 that maintains the motor current at the constant value, it is possible to avoid oscillation of the electric motor 4 and to reduce operation noise. Further, since the motor current is positively maintained at a constant value, more reduction in power consumption can be achieved than in the case where the braking force is controlled only by the braking force follow-up controller, in which the motor current, i.e., the motor torque, varies.

Regarding the predetermined range used for determination as to whether the braking force is in the follow-up state, the follow-up state determining function unit 26 may have a function of extending the range in the case where switching is performed from the control (or output) by the braking force maintaining controller 19 to the control (or output) by the braking force follow-up controller 18 more than the range in a case where switching is performed from the control by the braking force follow-up controller 18 to the control by the braking force maintaining controller 19. In this case, it is possible to avoid an event that switching between the control by the braking force follow-up controller 18 and the control by the braking force maintaining controller 19 frequently occurs, thereby improving stability of control.

The switching controller 20 may further include: a storage portion 27 configured to store therein the deviation between the braking force and the target braking force, which occurs when the control by the braking force maintaining controller 19 is canceled; and a corrector 28 configured to eliminate the deviation stored in the storage portion 27 from the target braking force immediately after the control (or output) by the braking force maintaining controller 19 has been canceled and switched to the control (or output) by the braking force follow-up controller 18, thereby providing a corrected target braking force. The corrector 28 may perform a process of causing an amount of correction, after the switching of control, to gradually converge to zero within a predetermined time period.

The predetermined time period is based on the result of a test, simulation, or the like, for example.

In this case, it is possible to avoid a steep operation immediately after the switching from the control (or output) by the braking force maintaining controller 19 to the control (or output) by the braking force follow-up controller 18, thereby further reducing the operating noise.

The switching controller 20 may further include a determiner 29 configured to determine whether or not at least one or both of the absolute value of the rate of change of the target braking force and an absolute value of the deviation between the braking force and the target value of the braking force (target braking force), after the control (or output) by the braking force maintaining controller 19 has been canceled and switched to the control (or output) by the braking force follow-up controller 18, are equal to or greater than predetermined values. When the determiner 29 has determined that any of the absolute values is equal to or greater than the predetermined value, correction by the corrector 28 is not permitted. The predetermined value is based on the result of a test, simulation, or the like. When the absolute value of the rate of change of the target braking force is equal to or greater than the predetermined value or when the absolute value of the deviation between the braking force and the target braking force is equal to or greater than the predetermined value, since a steep operation of the electric brake device DB is required at the switching from the control (or output) by the braking force maintaining controller 19 to the control (or output) by the braking force follow-up controller 18, the aforementioned function of avoiding the steep operation need not be executed. Therefore, in such a case, it is preferable to maximally exhibit responsiveness without executing the function of avoiding the steep operation.

The braking force maintaining controller 19 may include a relationship setter 19a configured to set a relationship between measured motor current and braking force. The braking force obtained when the switching controller 20 has determined that the condition is satisfied may be checked against the relationship setter 19a, thereby determining the motor current (braking force maintaining current, described later) to be maintained at the constant value. Since positive efficiency and reverse efficiency in the electric motor 4 can be measured in advance, if the respective relationships between the motor current and the braking force at the positive efficiency and the reverse efficiency are set in the relationship setter 19a consisting of a map or the like, the motor current to be maintained at the constant value can be determined with less calculation load. Thus, further reduction in power consumption can be achieved.

The braking force maintaining controller 19 may store therein an average value of the motor current in a predetermined time period until the switching controller 20 determines that the condition is satisfied. When the switching controller 20 has determined that the condition is satisfied and the control (constant current control described later) by the braking force maintaining controller 19 is executed, the stored average value of the motor current may be used as the motor current in the braking force maintaining controller 19. The predetermined time period is based on the result of a test, simulation, or the like.

In a case where large variation in characteristics of the electric motor or the like needs to be considered, it is sometimes difficult to form a map or the like in which the relationship between the motor current and the braking force is set. In such a case, the motor current near a time period at which the braking force follows up the target braking force (in the predetermined time period until the switching controller determines that the condition is satisfied) is considered to be substantially close to the motor current for maintaining the braking force. Therefore, by obtaining the average value of the motor current in the predetermined time period, the motor current in the braking force maintaining controller 19 can be determined without using a map or the like. Alternatively, the result based on the preset map or the like and the result based on the average value of the motor current may be used in combination as appropriate.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
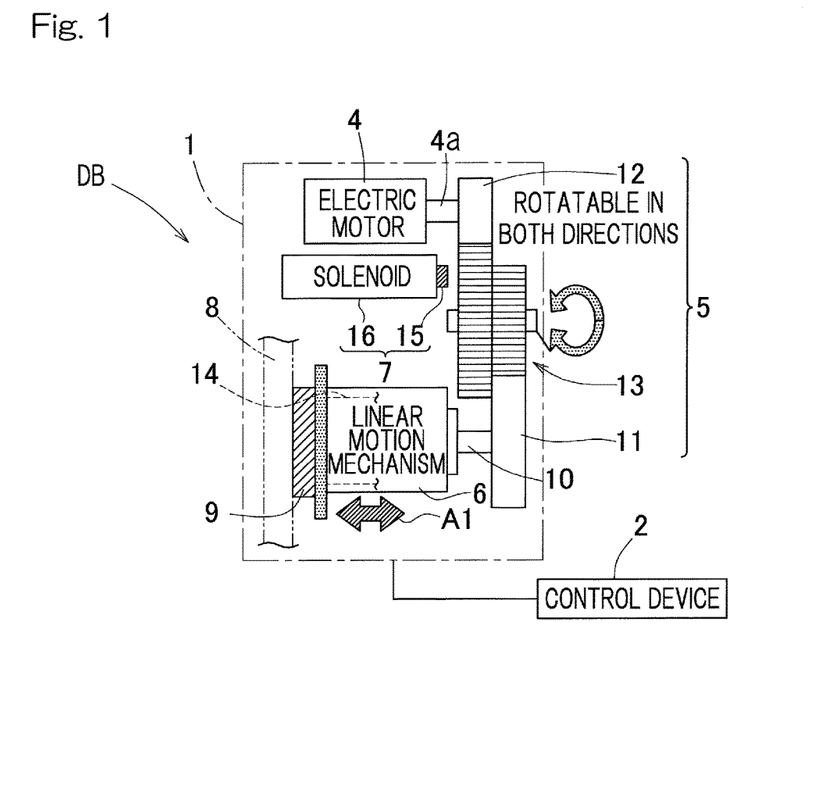
FIG. 1 is a diagram showing a schematic structure of an electric brake device according to an embodiment of the present invention.

An electric brake device according to an embodiment of the present invention will be described with reference to FIGS. 1 to 4. As shown in FIG. 1, the electric brake device DB includes an electric brake actuator 1, and a control device 2. First, the electric brake actuator 1 will be described.

Figure 2:
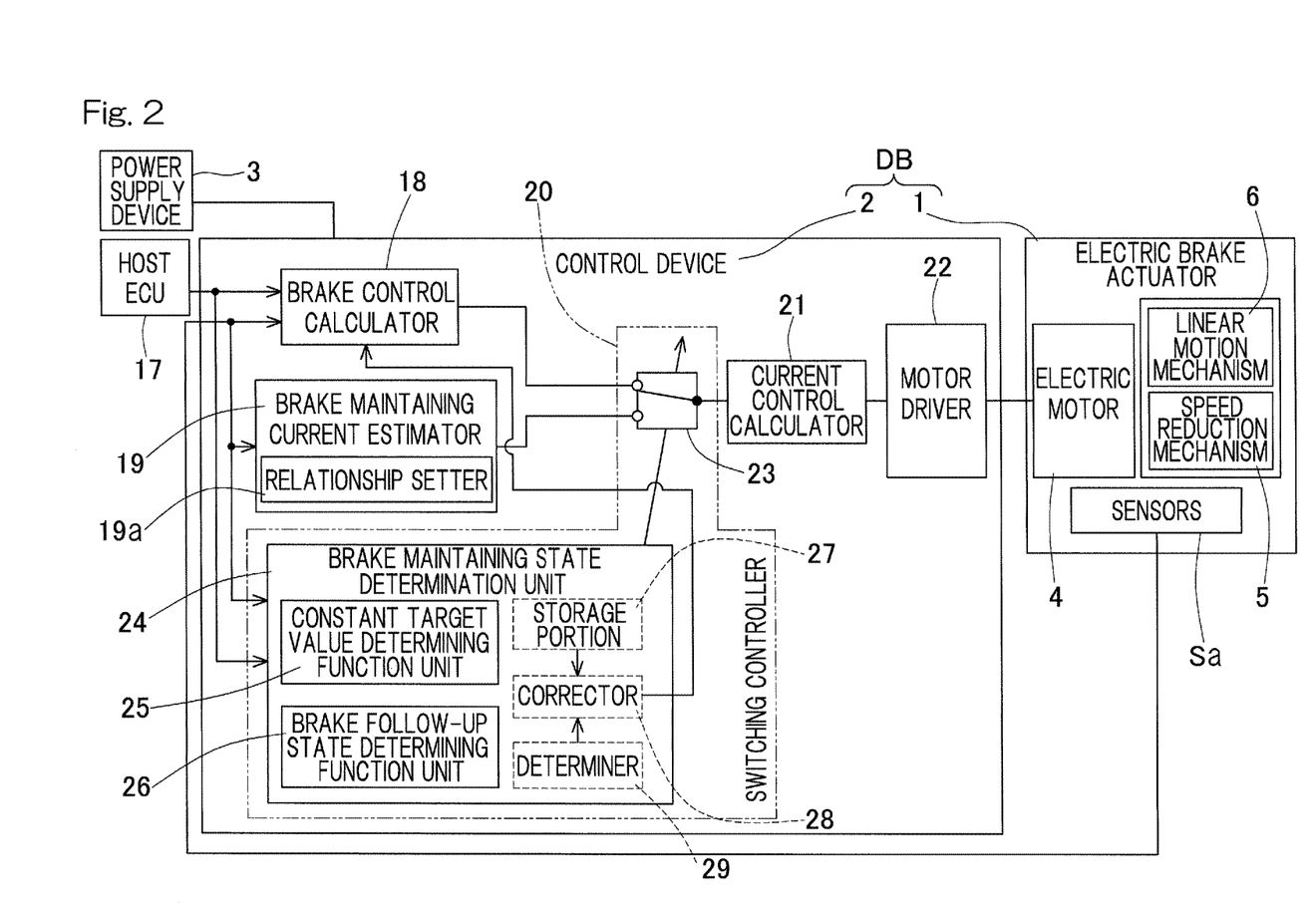
FIG. 2 is a block diagram showing an electric brake system including the electric brake device.

The electric brake actuator 1 includes: an electric motor 4; a speed reduction mechanism 5 that reduces the speed of rotation, or the number of rotation per unit time, of the electric motor 4; a linear motion mechanism 6 as a friction member operating actuator; a parking brake mechanism 7 as a parking brake; a brake rotor 8, a friction member 9; and sensors Sa (FIG. 2). The electric motor 4, the speed reduction mechanism 5, and the linear motion mechanism 6 are incorporated in, for example, a housing or the like that is not shown. The brake rotor 8 may be a disk type or a drum type. The friction member 9 is a brake pad, a brake shoe, or the like. The linear motion mechanism 6 includes a feed screw mechanism such as a ball screw mechanism or a planetary roller screw mechanism.

As for the electric motor 4, a brushless DC motor having excellent torque density and output density is preferably used, for example. The speed reduction mechanism 5 reduces the speed of rotation of the electric motor 4 and transmits the reduced rotation to a tertiary gear 11 fixed to a rotation shaft 10. The speed reduction mechanism 5 includes a primary gear 12, an intermediate gear (secondary gear) 13, and the tertiary gear 11. In this example, the speed reduction mechanism 5 reduces, by the intermediate gear 13, the speed of rotation of the primary gear 12 mounted to a rotor shaft 4a of the electric motor 4, and allows the rotation to be transmitted to the tertiary gear 11 fixed to an end portion of the rotation shaft 10.

The linear motion mechanism 6 converts, by the feed screw mechanism, rotary motion outputted from the speed reduction mechanism 5 into linear motion of a linear motion portion 14, and brings the friction member 9 into contact with the brake rotor 8 or separates the friction member 9 from the brake rotor 8. The linear motion portion 14 is supported so as to be prevented from rotating and be movable in an axial direction A1. The friction member 9 is provided at an outboard end of the linear motion portion 14. When rotation of the electric motor 4, which has been reduced in speed through the speed reduction mechanism 5, is transmitted to the linear motion mechanism 6, the rotary motion is converted into the linear motion, which is then converted into a pressing force of the friction member 9, whereby a braking force is generated. The term "outboard" means, in a state where the electric brake device DB is mounted to each wheel of a vehicle, its outer side of the vehicle in the vehicle width direction and its center side of the vehicle in the vehicle width direction is referred to as "inboard".

The parking brake mechanism 7 includes a locking member 15 and an actuator 16. In an outboard end surface of the intermediate gear 13, a plurality of locking holes (not shown) are formed at equal intervals in the circumferential direction. The locking member 15 is configured to be engageable with any one of the locking holes. For example, a solenoid is adopted as the actuator 16. The locking member (solenoid pin) 15 is advanced by the actuator 16 and fitted into the locking hole, which is formed in the intermediate gear 13, so as to be engaged with locking hole, thereby preventing the intermediate gear 13 to rotate. Thus, the parking brake mechanism 7 enters a parking lock state. The locking member 15 is retracted into the actuator 16 thereby to be disengaged from the locking hole, thereby allowing the intermediate gear 13 to rotate. Thus, the parking brake mechanism 7 enters an unlock state.

The control device 2 etc. are described. As shown in FIG. 2, this electric brake system includes the electric brake actuator 1, the control device 2, a host ECU 17, and a power supply device 3. The power supply device 3 and the host ECU 17 as higher-level control unit for the control device 2 are connected to the control device 2. As for the host ECU 17, an electric control unit that performs general control of the vehicle is adopted, for example. The host ECU 17 has the function of performing integrated control of each electric brake device DB. For example, a command regarding a target value of a braking force (target braking force) or the like, outputted from the host ECU 17, is inputted to the control device 2.

The power supply device 3 supplies power to each of the electric motor 4 and the control device 2 in the electric brake device DB. The control device 2 includes: a brake control calculator 18 as a braking force follow-up controller; a brake maintaining current estimator 19 as a braking force maintaining controller; a switching controller 20; a current control calculator 21; a motor driver 22; and the like.

The brake control calculator 18 calculates a motor current required for follow-up control of the braking force to the target braking force provided from the host ECU 17. Regarding the braking force, for example, a relationship between a braking force and a reaction force torque of a pressing force of the friction member 9 (FIG. 1) may be determined in advance through a test or the like, and the braking force may be estimated based on the predetermined relationship and a pressing force of the friction member 9 (FIG. 1) detected by, for example, a load sensor among the sensors Sa.

The brake maintaining current estimator 19 estimates a motor current (current of the electric motor 4) for maintaining the braking force constant, and maintains the motor current at a constant value. The brake maintaining current estimator 19 of this embodiment includes a relationship setter 19a that sets a relationship between measured motor current and braking force. In the electric motor 4, since positive efficiency when the braking force increases and reverse efficiency when the braking force decreases can be measured in advance through a test or the like, the respective relationships between the motor current and the braking force at the positive efficiency and the reverse efficiency are set in the relationship setter 19a consisting of a map or the like. Thus, the motor current to be maintained at a constant value can be determined with less calculation load.

The switching controller 20 performs switching between control (or output) by the braking force follow-up controller 18 and control (or output) by the braking force maintaining controller 19. The switching controller 20 includes: a selector switch 23 that switches between the output of the brake control calculator 18 and the output of the brake maintaining current estimator 19; and a brake maintaining state determination unit 24 that determines the brake maintaining state of the brake maintaining current estimator 19. The brake maintaining state determination unit 24 includes a constant target value determining function unit 25, and a follow-up state determining function unit (also referred to as "brake follow-up state determining function unit") 26.

The constant target value determining function unit 25 determines whether or not the target braking force provided from the host ECU 17 is a static command (substantially constant target value). Specifically, the constant target value determining function unit 25 determines whether or not an absolute value of the rate of change of the target braking force is equal to or less than a predetermined value. The brake follow-up state determining function unit (follow-up state determining function unit) 26 determines whether or not follow-up control to the target braking force has been substantially achieved, on the basis of information including a deviation between the braking force and the target braking force. In other words, the brake follow-up state determining function unit 26 determines whether or not the deviation between the braking force, estimated by the sensors Sa or the like, and the target braking force, provided from the host ECU 17, is within a predetermined range (that is, whether or not the brake control is in the follow-up state).

When a condition that; the constant target value determining function unit 25 has determined that the rate of change of the target braking force is equal to or less than the predetermined value; and the brake follow-up state determining function unit 26 has determined that the deviation between the braking force and the target braking force is within the predetermined range, is satisfied, the brake maintaining state determination unit 24 causes the selector switch 23 to switch from the output of the brake control calculator 18 to the output of the brake maintaining current estimator 19, or maintains the control mode of the brake maintaining current estimator 19.

The motor current, in the brake maintaining current estimator 19, for maintaining the braking force constant is determined on the basis of the braking force or the target braking force obtained when the above-mentioned brake maintaining state determination unit 24 has determined that the condition that: the rate of change of the target braking force is equal to or less than the predetermined value; and the deviation between the braking force and the target braking force is within the predetermined range, is satisfied.

The current control calculator 21 generates, from the values detected by the sensors Sa, a control signal for the motor driver 22 so as to attain the target braking force provided from the host ECU 17. The current control calculator 21 calculates a voltage value required for follow-up control to a target motor current corresponding to the target braking force. The motor driver 22 converts a DC power from the power supply device 3 into a three-phase AC power used for driving the electric motor 4. The motor driver 22 may configure a half-bridge circuit using a switching element such as a MOSFET, for example. The motor driver 22 may include a predriver that instantaneously drives the switching element.

The host ECU 17 may be called "VCU 17" in a four-wheeled vehicle, for example. The power supply device 3 may be a low-voltage power supply, such as a 12V-battery, or a DC-DC converter in an electric vehicle (abbreviated as EV), a hybrid electric vehicle (abbreviated as HEV), or the like. It is noted that the electric brake system shown in FIG. 2 includes minimum components necessary for representing the proposal of the inventor of the present invention, and therefore, an auxiliary power supply (not shown), and other functions relating to the electric brake system, such as various redundant functions and state estimation functions, are provided according to need.

Figure 3:
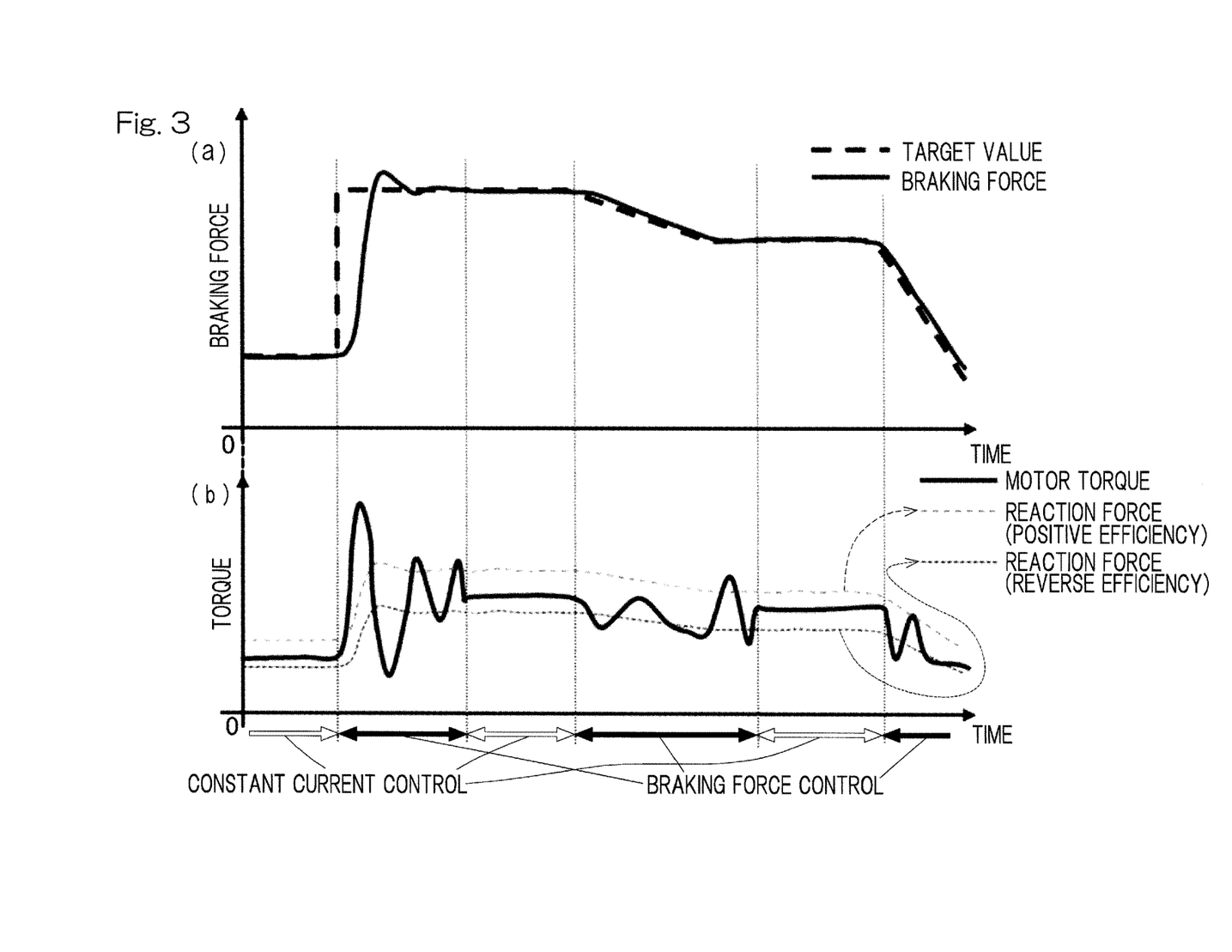
FIG. 3 is a diagram showing an example of operation and the like of the electric brake device.

FIG. 3 is a diagram showing an example of operation and the like of the electric brake device. FIG. 2 is also referred to as appropriate. In FIG. 3, chart (a) shows transition of a braking force with respect to a target value (target braking force), and chart (b) shows examples of a motor torque and reaction force torques based on positive efficiency and reverse efficiency, in response to the aforementioned transition of the braking force. In an electric motor, generally, a motor torque is substantially proportional to a motor current, if weak magnetic flux control or the like is excluded.

Therefore, the motor torque shown in chart (b) of FIG. 3 is considered to be equivalent to the motor current.

When the constant target value determining function unit 25 (FIG. 2) has determined that the target value provided from the host ECU 17 (FIG. 2) is substantially constant and the brake follow-up state determining function unit 26 has determined that the braking force sufficiently follows up the target value as shown in chart (a) of FIG. 3, constant current control is introduced as shown in chart (b) of FIG. 3, by which the motor current is maintained constant by the brake maintaining current estimator 19 (FIG. 2) or the like via the current control calculator 21.

When the target value (target braking force) does not vary as shown in chart (a) of FIG. 3, the motor current is maintained constant as shown in chart (b) of FIG. 3, whereby unnecessary oscillation of the electric motor 4 (FIG. 2) can be avoided. At this time, the aforementioned constant current control is executed on condition that both "the target value being substantially constant" and "the braking force sufficiently following up the target value" are satisfied.

For example, in the case where only "the target value being substantially constant" is satisfied, there is a possibility that a relatively large braking force error may occur in the target value that enters a static state after a steep change, such as a step input. On the other hand, in the case where only "the braking force sufficiently following up the target value" is satisfied, there is a possibility that, for example, control switching may occur frequently with respect to the target value that gradually varies, which may cause the response of the braking force to be stepwise.

Figure 8:
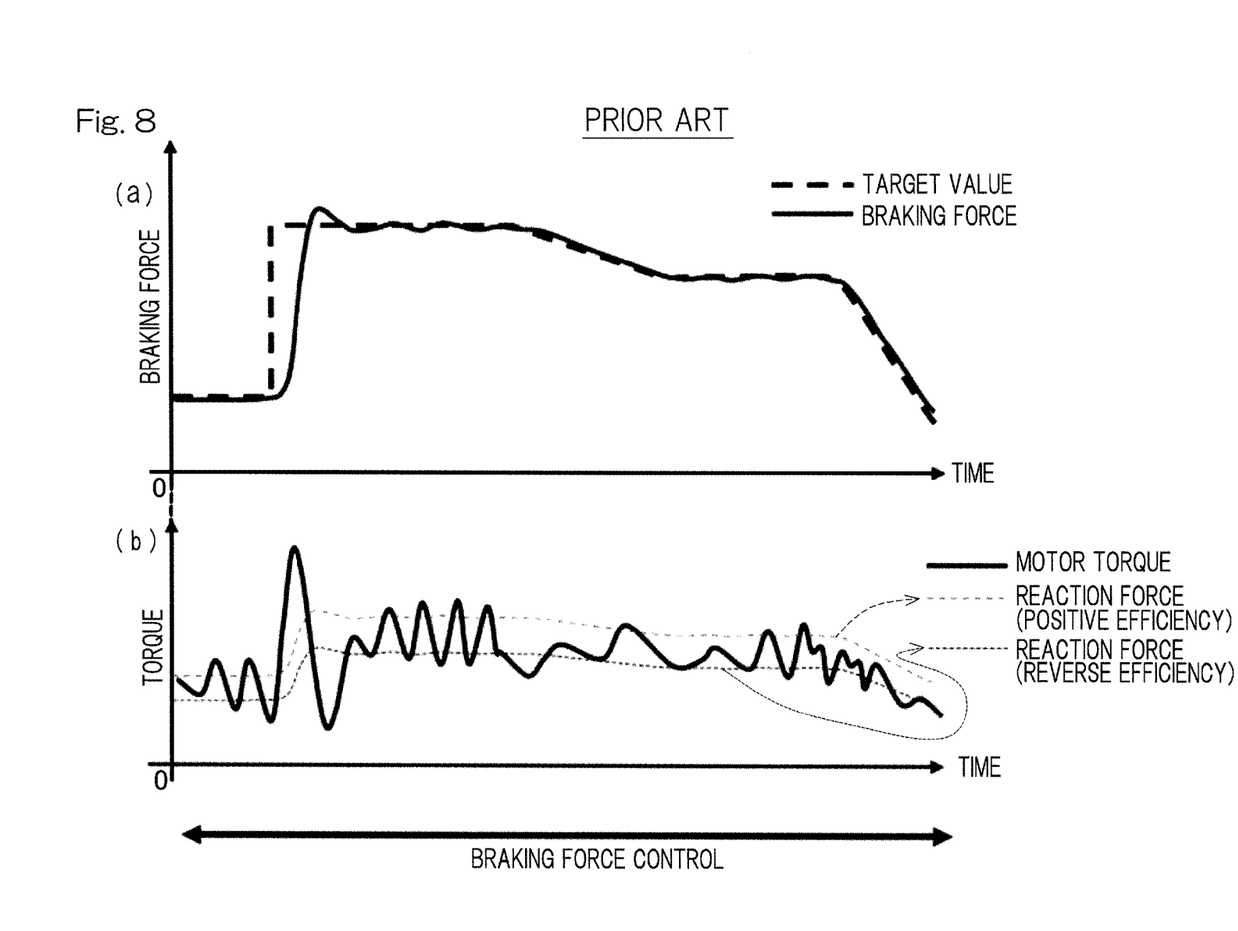
FIG. 8 is a diagram showing an example of operation of a conventional electric brake device.

FIG. 8 is a waveform diagram showing an example of operation of a conventional electric brake device. FIG. 8 shows a case where the aforementioned constant current control is not adopted. Due to influence of hysteresis of an actuator, a motor torque (motor current) varies as shown in chart (b) of FIG. 8 even when a target value (target braking force) is constant as shown in chart (a) of FIG. 8. In a servo system in which a braking force is desired to follow up a target value without a deviation, it is general to include an integral factor in control calculation. If the servo system has nonlinearity such as hysteresis characteristics in an electric brake device, the following problems may occur.

In a portion corresponding to hysteresis, a state is likely to occur where an integral value becomes an excessively large value because the actuator does not respond to change in the motor torque. In addition, since the reaction force torque corresponding to disturbance steeply changes with respect to change in direction of voltage increase/voltage decrease, an operation that may cause oscillation of the actuator is extremely likely to occur. Therefore, there is a possibility of torque fluctuation as shown in chart (b) of FIG. 8.

Figure 4:
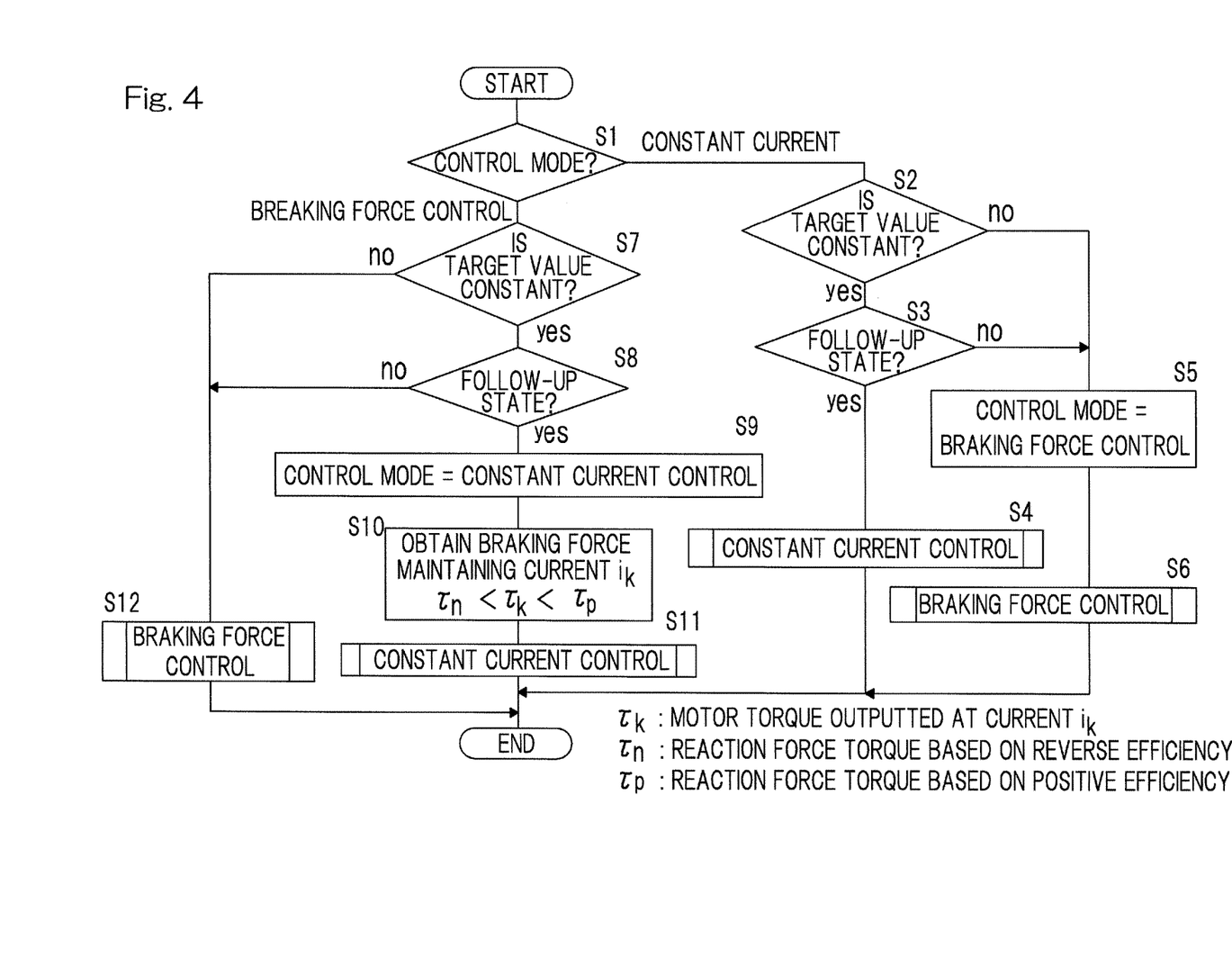
FIG. 4 is a flowchart showing braking force maintaining control and the like, executed by the electric brake device.

FIG. 4 is a flowchart showing control executed by the brake control calculator 18 and braking force maintaining control executed by the brake maintaining current estimator 19 in the electric brake device. FIG. 4 shows an example of determining a brake maintaining current (constant output current from the brake maintaining current estimator 19) on the basis of premeasured actuator characteristics or the like. After the processing is started, the switching controller 20 (FIG. 2) determines whether the control mode at present is braking force control or constant current control (step S1). The braking force control is control including all the functions of the brake control calculator 18 via the current control calculator 21 shown in FIG. 2.

When the control mode at present is the constant current control, the constant current control is maintained (step S4) if the constant target value determining function unit 25 (FIG. 2) has determined that the target value is substantially constant (step S2: yes) and the brake follow-up state determining function unit 26 has determined that the braking force sufficiently follows up the target value (step S3: yes). Thereafter, this processing is ended. When the control mode at present is the constant current control, the switching controller 20 (FIG. 2) switches the control mode to the braking force control (step S5) if it has been determined that the target value is not substantially constant (step S2: no) or if it has been determined that the braking force does not follow up the target value (step S3: no). Thereafter, the braking force control is executed by the brake control calculator 18 (FIG. 2) and the like (step S6).

When the control mode at present is the braking force control in step S1, the switching controller 20 (FIG. 2) switches the control mode to the constant current control (step S9) if the constant target value determining function unit 25 (FIG. 2) has determined that the target value is substantially constant (step S7: yes) and the brake follow-up state determining function unit 26 (FIG. 2) has determined that the braking force sufficiently follows up the target value (step S8: yes).

Next, the brake maintaining current estimator 19 (FIG. 2) checks, against the relationship setter 19a (FIG. 2), the braking force, which is obtained when the switching controller 20 (FIG. 2) has determined that the condition that the target value is substantially constant and the braking force is in the follow-up state to the target braking force is satisfied, thereby obtaining a braking force maintaining current $i_k$ (step S10). However, as for a motor torque $\tau_k$ that is outputted at the braking force maintaining current $i_k$, a relationship is established that the motor torque $\tau_k$ is greater than a reaction force torque $\tau_n$ based on reverse efficiency in hysteresis characteristics and is smaller than a reaction force torque $\tau_p$ based on positive efficiency in hysteresis characteristics.

Next, constant current control is executed by the brake maintaining current estimator 19 (FIG. 2) and the like, on the basis of the braking force maintaining current $i_k$ (step S11). When the condition that the target value is substantially constant and the braking force is in the follow-up state is not satisfied (step S7: no, or step S8: no), the braking force control is maintained (step S12). Thereafter, this processing is ended.

According to the electric brake device DB described above, when the condition that the target value is substantially constant and the braking force is in the follow-up state is satisfied, the constant current control by the brake maintaining current estimator 19 is maintained or the control mode is switched to the constant current control. Since the electric brake device, in which oscillation of the electric motor is likely to occur due to the influence of the hysteresis characteristics, is provided with the brake maintaining current estimator 19 that maintains the motor current at a constant value, it is possible to avoid oscillation of the electric motor 4 and to achieve reduction in operating noise. Further, since the motor current is positively maintained at a constant value, more reduction in power consumption can be achieved than in the case where the braking force is controlled only by the brake control calculator 18, in which the motor current, that is, the motor torque, varies.

Specifically, the brake control calculator 18, the brake maintaining current estimator 19, the current control calculator 21, the constant target value determining function unit 25, the brake follow-up state determining function unit 26, and a later-described corrector 28 and a determiner 29 are each configured by a hardware circuit or a software function on a processor (not shown), which is able to perform operation and output results by using, for example, a LUT (Look Up Table) implemented by software or hardware, or a predetermined transform function stored in a library of software or equivalent hardware thereto, or using, according to need, a comparison function and an arithmetical operation function and equivalent hardware thereto.

Other embodiments will be described. In the following description, the components corresponding to the matters described in the preceding embodiment are denoted by like reference numerals, and the details thereof may not be reiterated. When only a part of the configuration is described, the other part of the configuration is the same as described in the preceding description unless otherwise specified. The same operation and effect can be obtained from the same configuration. A combination of parts that are specifically described in the embodiments can be implemented, and further, the embodiments may be partially combined unless such combinations cause any problem. Instead of the example of obtaining the braking force maintaining current $i_k$ shown in step S10 of FIG. 4, step S10A shown in FIG. 5 may be adopted. In step S10A, a brake maintaining current is determined on the basis of, for example, an average value of current values at which a braking force is maintained by the braking force control. Specifically, as shown in FIGS. 2 and 5, the brake maintaining current estimator 19 stores therein an average value of motor current in a predetermined time period until the switching controller 20 determines that the condition that the target value is substantially constant and the braking force is in the followed-up state is satisfied (step S10A in FIG. 5).

Figure 5:
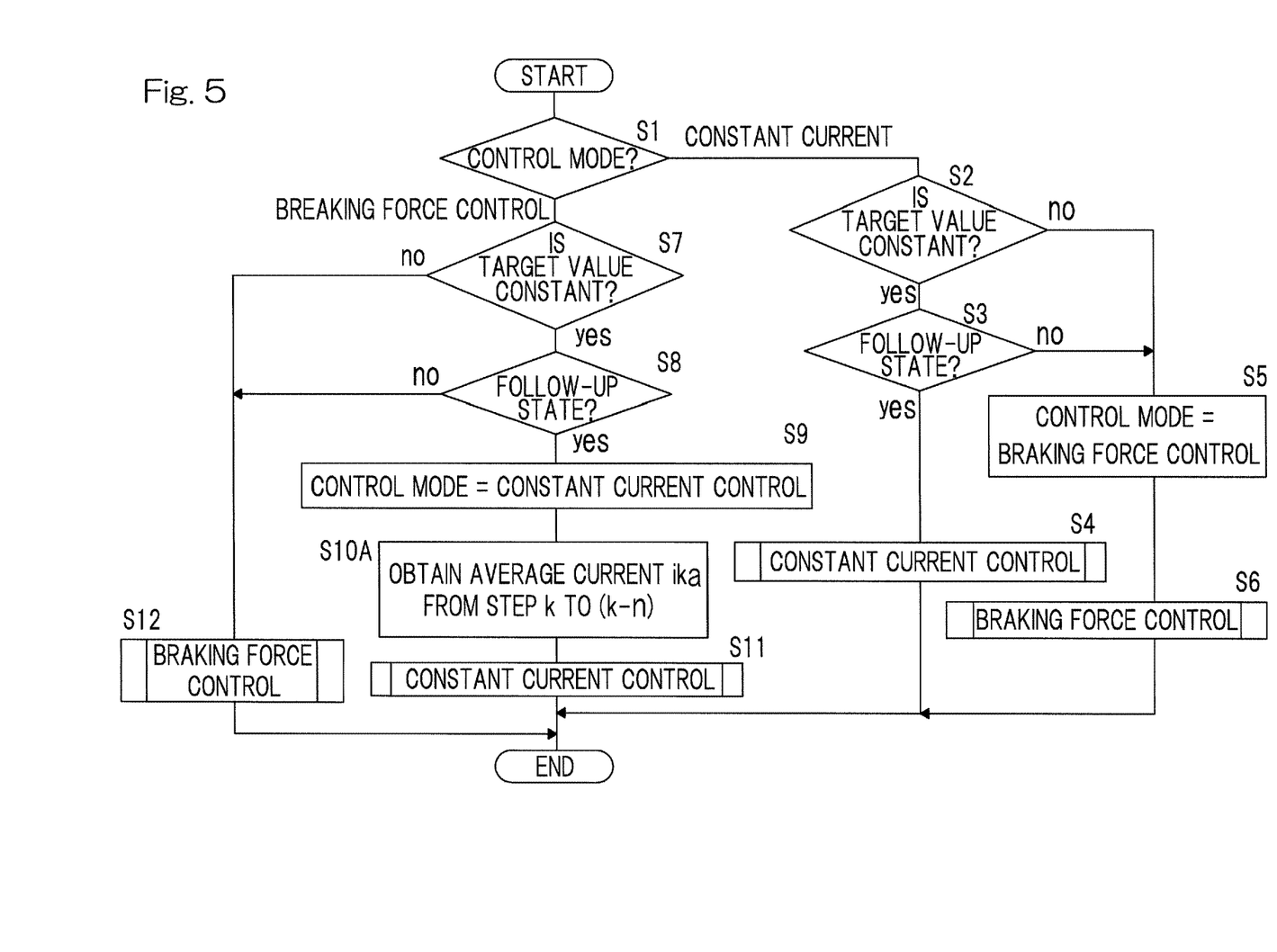
FIG. 5 is a flowchart showing braking force maintaining control and the like, executed by an electric brake device according to another embodiment of the present invention.

When the switching controller 20, upon determining that the above condition is satisfied, executes the constant current control, the constant current control is executed by the brake maintaining current estimator 19 and the like on the basis of the stored average value $i_{ka}$ of the motor current (step S11 in FIG. 5). In step S10A of FIG. 5, step k indicates a value on a calculation cycle at present, and k-n indicates a value on a calculation cycle that is n steps previous to the step k.

For example, in a case where large variation in characteristics of the electric motor or the like needs to be considered, it is sometimes difficult to form a map or the like in which the relationship between the motor current and the braking force is set. In such a case, the motor current near a time period at which the braking force follows up the target braking force (in the predetermined time period until the switching controller 20 determines that the above condition is satisfied) is considered to be substantially close to the motor current for maintaining the braking force.

Therefore, by obtaining the average value of the motor current in the predetermined time period, the motor current in the brake maintaining current estimator 19 can be determined without using a map or the like. In particular, in a low load region in which it is difficult to accurately measure the relationship between the motor current and the braking force, reliability of the constant current control can be improved. Further, by executing the constant current control by using the average value of the motor current, the allowable range of model errors is advantageously increased.

Figure 6A:
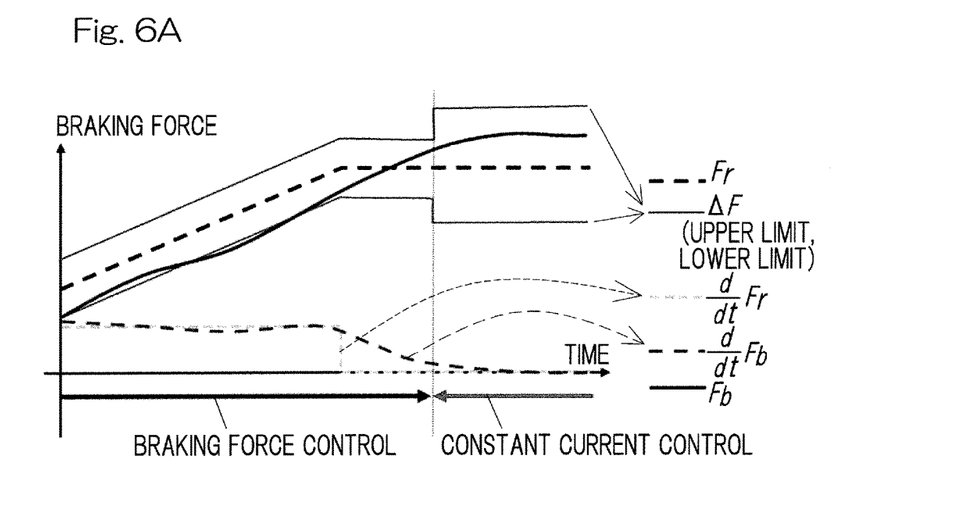
FIG. 6A is a diagram showing operation waveforms when shifting from braking force control to constant current control is performed by an electric brake device according to still another embodiment of the present invention, in which hysteresis characteristics are included.
Figure 6B:
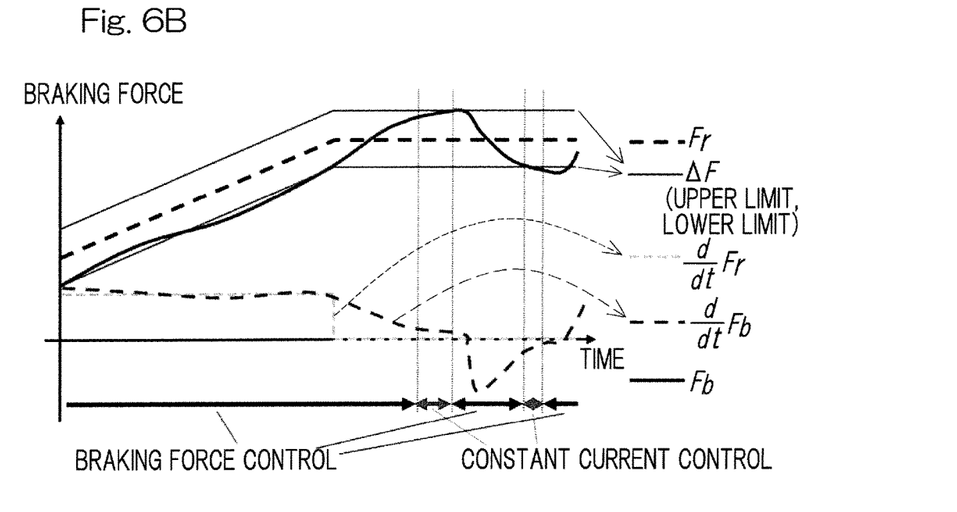
FIG. 6B is a diagram showing operation waveforms when shifting from braking force control to constant current control is performed by an electric brake device according to still another embodiment of the present invention, in which hysteresis characteristics are not included.

FIGS. 6A and 6B show operation waveforms when shifting from braking force control to constant current control is performed by an electric brake device according to still another embodiment. FIGS. 6A and 6B each show an example in which shifting from braking force control to constant current control (braking force maintaining operation) is performed when an absolute value of a rate of change (d/dt) $F_r$ of a target value $F_r$ and an absolute value of a rate of change (d/dt) $F_b$ of a braking force $F_b$ are equal to or less than predetermined values, respectively, and the deviation between the braking force and the target value (target braking force) is within a predetermined range $\Delta F$.

In the above case, the larger the range of each predetermined value used for determination as to whether the target value is substantially constant and the braking force is in the followed-up state, the more stably the constant current control can be executed. However, control accuracy is degraded as compared to that in the case where the range of each predetermined value is narrowed, thereby causing a relationship of trade-off. Further, when control switching is performed between the braking force control and the constant current control, behavior caused by frequent occurrence of the control switching may become a problem.

FIG. 6A shows an example in which the brake follow-up state determining function unit 26 (FIG. 2) causes the predetermined range $\Delta F$ to have hysteresis characteristics that allow an increase of the range $\Delta F$ when shifting to the constant current control is performed. When switching of the control mode from the braking force control to the constant current control occurs, the braking force varies due to inertial movement mainly caused by inertia of the actuator, as long as the rate of change (d/dt) $F_b$ of the braking force $F_b$ is not exactly zero. At this time, by providing the hysteresis characteristics that allow an increase of the predetermined range $\Delta F$, an event that control switching frequently occurs is avoided, thereby improving stability of control.

FIG. 6B shows an example in which the hysteresis characteristics shown in FIG. 6A are not adopted. In this example, the deviation between the braking force and the target value frequently goes into and out of the predetermined range $\Delta F$. Thereby, control switching between the braking force control and the constant current control frequently occurs, which may cause unnecessary oscillation of the actuator. However, as compared to the conventional art shown in FIG. 8 in which the constant current control is never adopted, the operation that may cause oscillation of the actuator can be suppressed, thereby reducing torque fluctuation.

Figure 7A:
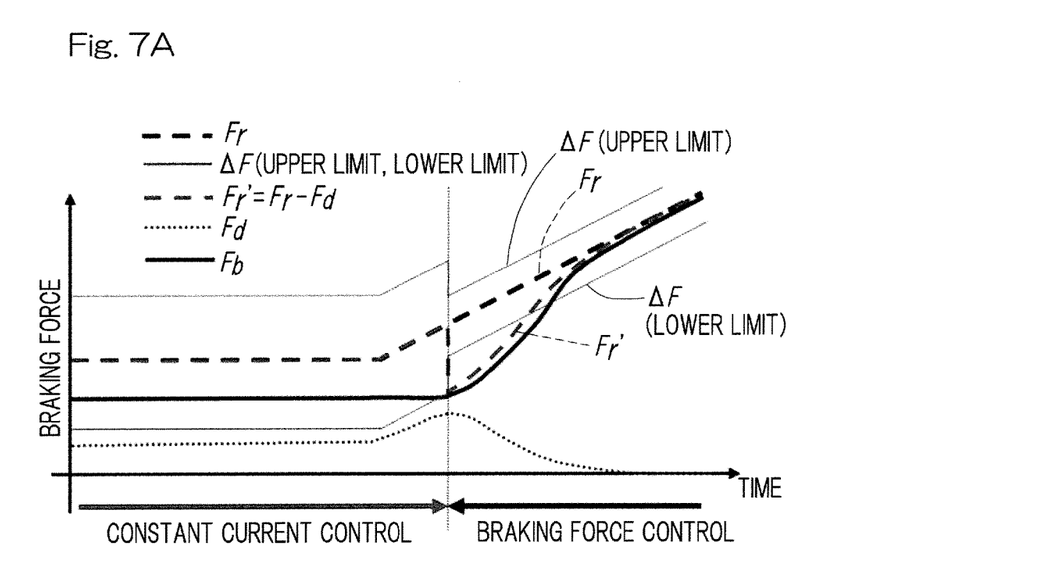
FIG. 7A is a diagram showing operation waveforms when shifting from constant current control to braking force control is performed by an electric brake device according to still another embodiment of the present invention, in which a correcting process is executed.
Figure 7B:
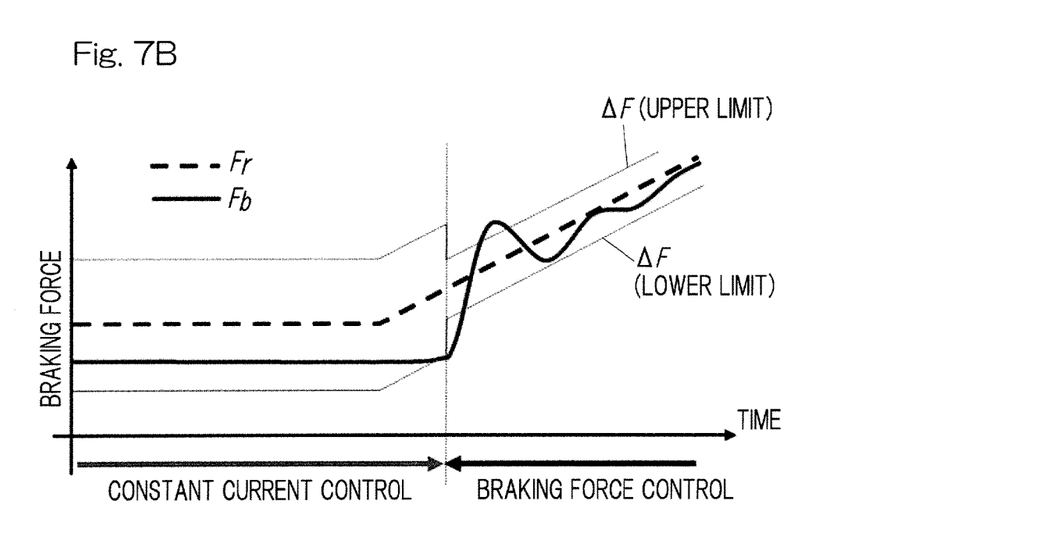
FIG. 7B is a diagram showing operation waveforms when shifting from constant current control to braking force control is performed by an electric brake device according to still another embodiment of the present invention, in which a correcting process is not executed.

FIGS. 7A and 7B show operation waveforms when shifting from the constant current control to the braking force control is performed. Since it is difficult to generate an ideal state in which the rate of change (d/dt) $F_b$ of the braking force $F_b$ is exactly zero and the deviation between the braking force and the target value is exactly zero, a predetermined deviation occurs in the state of the constant current control. Therefore, when switching from the constant current control to the braking force control is performed, the predetermined deviation abruptly occurs. The abrupt occurrence of the deviation causes the braking force immediately after the control switching to be a steep response, which may cause a problem such as increase in operating noise.

In the example shown in FIG. 7A, when switching from the constant current control to the braking force control is performed, a target value correcting component $F_d$, which is a deviation immediately before the control switching, is subtracted from the target value $F_r$ as the target braking force to provide a corrected target value $F_r'$ ($F_r' = F_r - F_d$), and a command value is generated so that the target value correcting component $F_d$ gradually converges to zero within a subsequent predetermined time period.

In this example, as shown in FIG. 2, the brake maintaining state determination unit 24 further includes a storage portion 27, the corrector 28, and the determiner 29. The storage portion 27 stores therein the target value correcting component $F_d$ which is the deviation between the braking force $F_b$ and the target value $F_r$ when the constant current control is canceled. The corrector 28 subtracts the target value correcting component $F_d$ stored in the storage portion 27 from the target value $F_r$ immediately after the constant current control is canceled and the control mode is switched to the braking force control, thereby providing the corrected target value $F_r'$.

The determiner 29 determines: whether or not the absolute value of the rate of change of the target braking force is equal to or greater than a predetermined value; and whether or not the absolute value of the deviation between the braking force and the target braking force is equal to or greater than a predetermined value (i.e., whether or not the deviation is within the predetermined range as described above), after the control by the braking force maintaining controller 19 is canceled and the control mode is switched to the control by the braking force follow-up controller 18. When the determiner 29 has determined that at least one of the aforementioned absolute values is equal to or greater than the predetermined value, correction by the corrector 28 is not permitted. In this case, it is considered that a steep response of the braking force of the electric brake device is desired when control switching from the constant current control to the braking force control is performed. Therefore, the aforementioned function of avoiding the steep response need not be executed, and it is preferable to maximally exhibit responsiveness without executing the function of avoiding the steep response.

As for the target value correcting component $F_d$, for example, the deviation between the braking force $F_b$ and the target value $F_r$ is stored in the storage portion 27 to be updated only for the constant current control, so that the deviation can be implemented as a variable that gradually converges to zero after shifting to the braking force control. The aforementioned correcting process avoids the situation that the deviation between the braking force and the target value abruptly occurs and the response becomes oscillatory when shifting from the constant current control to the braking force control (i.e., normal braking force follow-up operation) is performed, thereby avoiding the increase in operating noise, and the like.

FIG. 7B shows an example in which the correcting process shown in FIG. 7A is not adopted. In the example of FIG. 7B, the deviation between the braking force $F_b$ and the target value $F_r$ abruptly occurs when shifting from the constant current control to the braking force control is performed, which may cause the response of the braking force $F_b$ immediately after the control switching to be oscillatory.

The constant target value determining function unit 25 (FIG. 2) may determine that the target value is substantially constant because, for example, an output error of a plurality of delay factors having different degrees of delay, such as filters having different time constants, is equal to or less than a predetermined value. In this case, influence of noise or the like can be easily removed. The brake follow-up state determining function unit 26 (FIG. 2) may determine that the braking force sufficiently follows up the target value because, for example, the absolute value of the deviation between the braking force and the target value is equal to or less than a predetermined value and the absolute value of a differential value of the braking force or a differential value of the deviation is equal to or less than a predetermined value.

The sensors Sa may include a motor angle sensor, and a braking force estimating sensor that estimates a braking force. As for the electric motor 4, a DC motor with brushes or an induction motor may be adopted. As for the linear motion mechanism 6, a mechanism such as a ball ramp may be adopted. As for the speed reduction mechanism 5, a parallel gear or a planetary gear may be adopted.

A vehicle equipped with the electric brake device DB may be an electric vehicle whose drive wheels are driven by motors, or may be a hybrid vehicle in which one of each front wheel and each rear wheel is driven by a combustion engine and the other is driven by a motor. In addition, an engine vehicle whose drive wheels are driven by only the engine may be adopted as the vehicle.

Although the preferred modes for carrying out the present invention have been described on the basis of the embodiments with reference to the drawings, the embodiments disclosed herein are, in all aspects, illustrative and not restrictive. The scope of the present invention is indicated by claims, not by the above description. Those skilled in the art will readily conceive numerous changes and modifications within the framework of obviousness upon the reading of the specification herein presented of the present invention. Accordingly, such changes and modifications are to be construed as included in the scope of the invention defined by claims or in a scope equivalent thereto.

REFERENCE NUMERALS

2 . . . control device
4 . . . electric motor
6 . . . linear motion mechanism (friction member operating actuator)
8 . . . brake rotor
9 . . . friction member
17 . . . host ECU (higher-level control unit)
18 . . . brake control calculator (braking force follow-up controller)
19 . . . brake maintaining current estimator (braking force maintaining controller)
19a . . . relationship setter
20 . . . switching controller
26 . . . brake follow-up state determining function unit
27 . . . storage portion
28 . . . corrector
29 . . . determiner
DB . . . electric brake device

What is claimed is:

1. An electric brake device comprising: a brake rotor; a friction member configured to be brought into contact with the brake rotor; a friction member operating actuator configured to bring the friction member into contact with the brake rotor; an electric motor configured to drive the friction member operating actuator; and a control device configured to control a braking force by means of the electric motor, the control device including: a braking force follow-up controller configured to control the braking force so as to follow up a target braking force provided from a higher-level control unit; a braking force maintaining controller configured to maintain a current of the electric motor or motor current at a constant value; and a switching controller configured to perform switching between control by the braking force follow-up controller and control by the braking force maintaining controller, the switching controller including: a constant target value determining function unit configured to determine whether or not a target value is constant, depending on whether or not an absolute value of a rate of change of the target braking force is equal to or less than a predetermined value; and a follow-up state determining function unit configured to determine whether or not the braking force is in a follow-up state to the target braking force, depending on whether or not a deviation between the braking force and the target braking force is within a predetermined range, wherein when a condition, which the constant target value determining function unit has determined that the target value is constant and the follow-up state determining function unit has determined that the braking force is in the follow-up state, is satisfied, switching is performed from the control by the braking force follow-up controller to the control by the braking force maintaining controller which maintains the motor current at a constant value, and the motor current maintained at the constant value by the braking force maintaining controller is a motor current that is determined on the basis of the braking force or the target braking force obtained when the switching controller has determined that the condition is satisfied.

2. The electric brake device as claimed in claim 1, wherein regarding the predetermined range used for determination as to whether the braking force is in the follow-up state, the follow-up state determining function unit has a function of extending the range in a case where switching is performed from the control by the braking force maintaining controller to the control by the braking force follow-up controller more than the range in a case where switching is performed from the control by the braking force follow-up controller to the control by the braking force maintaining controller.

3. The electric brake device as claimed in claim 1, wherein the switching controller further includes:

a storage portion configured to store therein the deviation between the braking force and the target braking force, which occurs when the control by the braking force maintaining controller is canceled; and a corrector configured to eliminate the deviation stored in the storage portion from the target braking force immediately after the control by the braking force maintaining controller has been canceled and switched to the control by the braking force follow-up controller, thereby providing a corrected target braking force, wherein the corrector performs a process of causing an amount of correction, after the switching of control, to gradually converge to zero within a predetermined time period.

4. The electric brake device as claimed in claim 3, wherein the switching controller further includes a determiner configured to determine whether or not at least one or both of the absolute value of the rate of change of the target braking force and an absolute value of the deviation between the braking force and the target braking force, after the control by the braking force maintaining controller has been canceled and switched to the control by the braking force follow-up controller, are equal to or greater than predetermined values, and when the determiner has determined that any of the absolute values is equal to or greater than the predetermined value, correction by the corrector is not permitted.

5. The electric brake device as claimed in claim 1, wherein the braking force maintaining controller includes a relationship setter configured to set a relationship between measured motor current and braking force, and the braking force obtained when the switching controller has determined that the condition is satisfied is checked against the relationship setter, thereby determining the motor current to be maintained at the constant value.

6. The electric brake device as claimed in claim 1, wherein the braking force maintaining controller stores therein an average value of the motor current in a predetermined time period until the switching controller determines that the condition is satisfied, and when the switching controller has determined that the condition is satisfied and the control by the braking force maintaining controller is executed, the stored average value of the motor current is used as the motor current to be maintained by the braking force maintaining controller.

* * * * *